H. TULLER.
AXLE.
APPLICATION FILED NOV. 22, 1910.

1,001,905.

Patented Aug. 29, 1911.

Witnesses
Arlita Adams
James E. Sproll

Inventor
Herman Tuller
By Adams & Brooks
Attorneys

COLUMBIA PLANOGRAPH CO., WASHINGTON, D. C.

UNITED STATES PATENT OFFICE.

HERMAN TULLER, OF BELLINGHAM, WASHINGTON.

AXLE.

1,001,905. Specification of Letters Patent. Patented Aug. 29, 1911.

Application filed November 22, 1910. Serial No. 593,754.

*To all whom it may concern:*

Be it known that I, HERMAN TULLER, a citizen of the United States of America, and a resident of the city of Bellingham, in the county of Whatcom and State of Washington, have invented certain new and useful Improvements in Axles, of which the following is a specification.

My invention relates to axles, having more particular reference to detachable spindles therefor, and has for its primary object to provide a novel construction which embraces certain features of simplicity, durability and general efficiency.

With this fundamental object in view, my invention resides in the construction and arrangements of parts hereinafter described and succinctly defined in my annexed claim.

Figure 1:
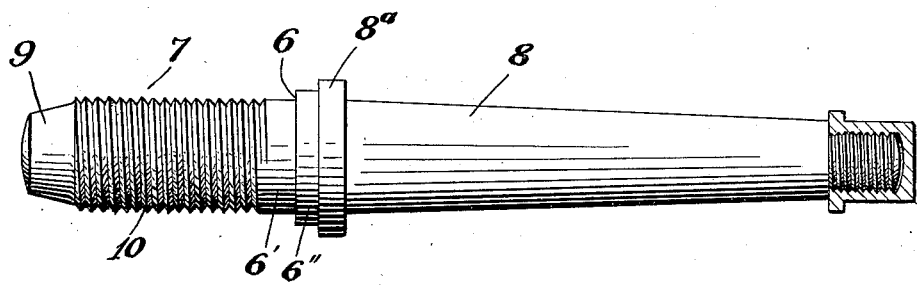
Figure 2:
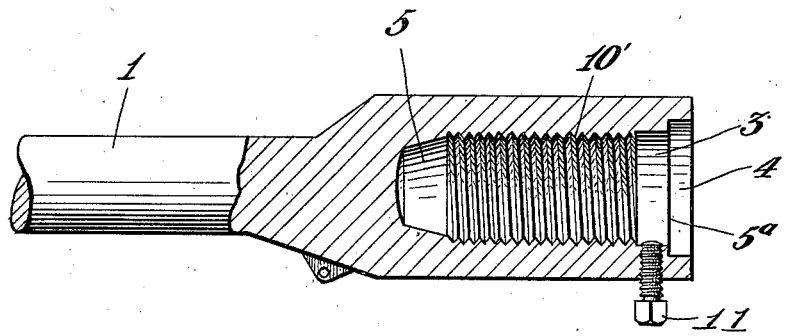
Figure 3:
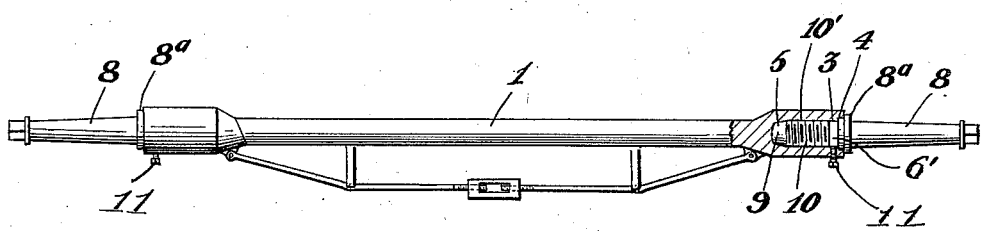

Referring to the accompanying drawing, wherein like numerals of reference indicate like parts throughout: Figure 1 is an elevation of a spindle constructed in accordance with my invention. Fig. 2 is a fragmentary sectional view of the axle, and Fig. 3 is an elevation of an axle provided with my detachable spindles, one end portion of said axle being broken away.

Referring to the drawing by numerals of reference, 1 indicates an axle of any desired type provided in its end portions with sockets which sockets have their outer end portions provided with stepped bearings 3 and 4 and their inner end portions provided with tapered seats 5. Bearing 3 is of less diameter than bearing 4 and is connected therewith by an annular shoulder $5^a$, against which a similar shoulder 6 on the shank 7 of spindle 8 has bearing. Shoulder 6 lies between two unthreaded bearing portions 6', 6'', of shank 7 which are of such diameter as to have snug engagement with bearings 3 and 4 respectively. Shank bearing portion 6'' extends to a shoulder $8^a$, of relatively greater diameter, which normally abuts the end of axle 1, as shown in Fig. 3.

The inner end portion or extension of shank 7 is tapered and unthreaded, as at 9, for snug engagement with seat 5 to, in conjunction with the said shoulders on the outer end portion of shank 7 relieve the intermediate threaded portion 10 of the load or torsional strains. This externally threaded intermediate portion 10 of shank 7, which at the root of its threads is of the same diameter as bearing portion 6' engages a correspondingly threaded portion 10'' of socket 2.

In operation, in screwing a shank 7 to seat the same, its shoulders $8^a$, 6 and bearing extension 9 will, under perfect conditions, simultaneously engage the end portion of axle 1, shoulder $5^a$ and seat 5 respectively. Through the provision of the elongated coacting bearings 3, 4, 6' and 6'', however, such nicety of adjustment is not absolutely essential to insure rigidity between the parts.

A set screw 11, mounted in the wall of socket 2 and normally engaging bearing 6' acts with extension 9, which in practice is adapted to be wedged in seat 5, to lock spindle 8 against accidental displacement.

Having thus described my invention, what I claim as new, and desire to secure by Letters Patent of the United States of America, is:

An axle formed in one end portion with a socket, said socket being provided in its outer end portion with an inwardly projecting shoulder and with bearings of different diameters connected thereby, said socket at its inner end portion being provided with a tapered seat, which latter is connected with inner of said bearings by a screw threaded portion, and a spindle having a shank having a tapered free end portion for engagement in the seat of said socket and provided at its outer end portion with an external shoulder adapted to abut the end of said axle, said shank being provided at an intermediate point with an externally threaded portion outwardly of which are stepped bearing portions arranged for engagement with the bearings of said socket.

Signed at Seattle, Washington, this 14th day of November, 1910.

HERMAN TULLER.

Witnesses:
 STEPHEN A. BROOKS,
 HERCHMER JOHNSTON.

Copies of this patent may be obtained for five cents each, by addressing the "Commissioner of Patents. Washington, D. C."